US012287649B2

(12) United States Patent
Choi

(10) Patent No.: US 12,287,649 B2
(45) Date of Patent: Apr. 29, 2025

(54) APPARATUS AND METHOD FOR OPERATING ELECTRONIC DETONATOR BLASTER WITH INTEGRATED FLIGHT FUNCTION

(71) Applicant: HANWHA CORPORATION, Seoul (KR)

(72) Inventor: Jeong Ho Choi, Cheongju-si (KR)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 18/279,097

(22) PCT Filed: Jul. 7, 2023

(86) PCT No.: PCT/KR2023/009645
§ 371 (c)(1),
(2) Date: Aug. 28, 2023

(87) PCT Pub. No.: WO2024/143734
PCT Pub. Date: Jul. 4, 2024

(65) Prior Publication Data
US 2025/0028333 A1    Jan. 23, 2025

(30) Foreign Application Priority Data

Dec. 27, 2022  (KR) .......................... 10-2022-0185384

(51) Int. Cl.
*G05D 1/646*    (2024.01)
*F42D 1/055*    (2006.01)
(Continued)

(52) U.S. Cl.
CPC ............. *G05D 1/646* (2024.01); *F42D 1/055* (2013.01); *G05D 1/654* (2024.01); *G05D 2105/05* (2024.01); *G05D 2109/254* (2024.01)

(58) Field of Classification Search
CPC .... G05D 1/646; G05D 1/654; G05D 2105/05; G05D 2109/254; F42D 1/055
See application file for complete search history.

(56) References Cited

U.S. PATENT DOCUMENTS 9,849,981 B1 * 12/2017 Burgess .................... B64D 1/22
2010/0005994 A1 *  1/2010 Jacobson .................. F42B 1/02
                                                          102/215
(Continued)

FOREIGN PATENT DOCUMENTS

JP            7172594 B2    11/2022
KR      10-2018-0063595 A    6/2018
(Continued)

OTHER PUBLICATIONS

Machine Translation of JP2020106249 retrieved from Espacenet on Nov. 26, 2024 (Year: 2024).*

*Primary Examiner* — Thomas Ingram
(74) *Attorney, Agent, or Firm* — WHDA, LLP

(57) ABSTRACT

Proposed are an apparatus and a method for operating an electronic detonator blaster with an integrated flight function. The apparatus includes a blasting command transmission part configured to transmit a blasting command to each of electronic detonators which are combined with a flying vehicle capable of being flown and controlled by induction of radio waves and are connected to each other, a connection control part configured to release the connection of the flying vehicle with the electronic detonators when the transmission of the blasting command is completed, and a flight control part configured to control the flying vehicle to land at a preset return point after ascending to a preset altitude when the connection of the flying vehicle with the electronic detonators is completely released.

10 Claims, 4 Drawing Sheets

(51) Int. Cl.
     *G05D 1/654*        (2024.01)
     *G05D 105/05*     (2024.01)
     *G05D 109/25*     (2024.01)

(56) References Cited

U.S. PATENT DOCUMENTS

| | | | | |
|---|---|---|---|---|
| 2020/0324902 A1* | 10/2020 | Burgess | | B64D 1/22 |
| 2022/0074712 A1 | 3/2022 | Oh | | |
| 2022/0212791 A1* | 7/2022 | Knab | | F42D 3/00 |
| 2024/0361115 A1* | 10/2024 | Kotsonis | | G05B 19/048 |

FOREIGN PATENT DOCUMENTS

| | | | |
|---|---|---|---|
| KR | 10-2018-0076015 A | 7/2018 | |
| KR | 10-1978494 B1 | 5/2019 | |
| KR | 10-2393330 B1 | 5/2022 | |

* cited by examiner

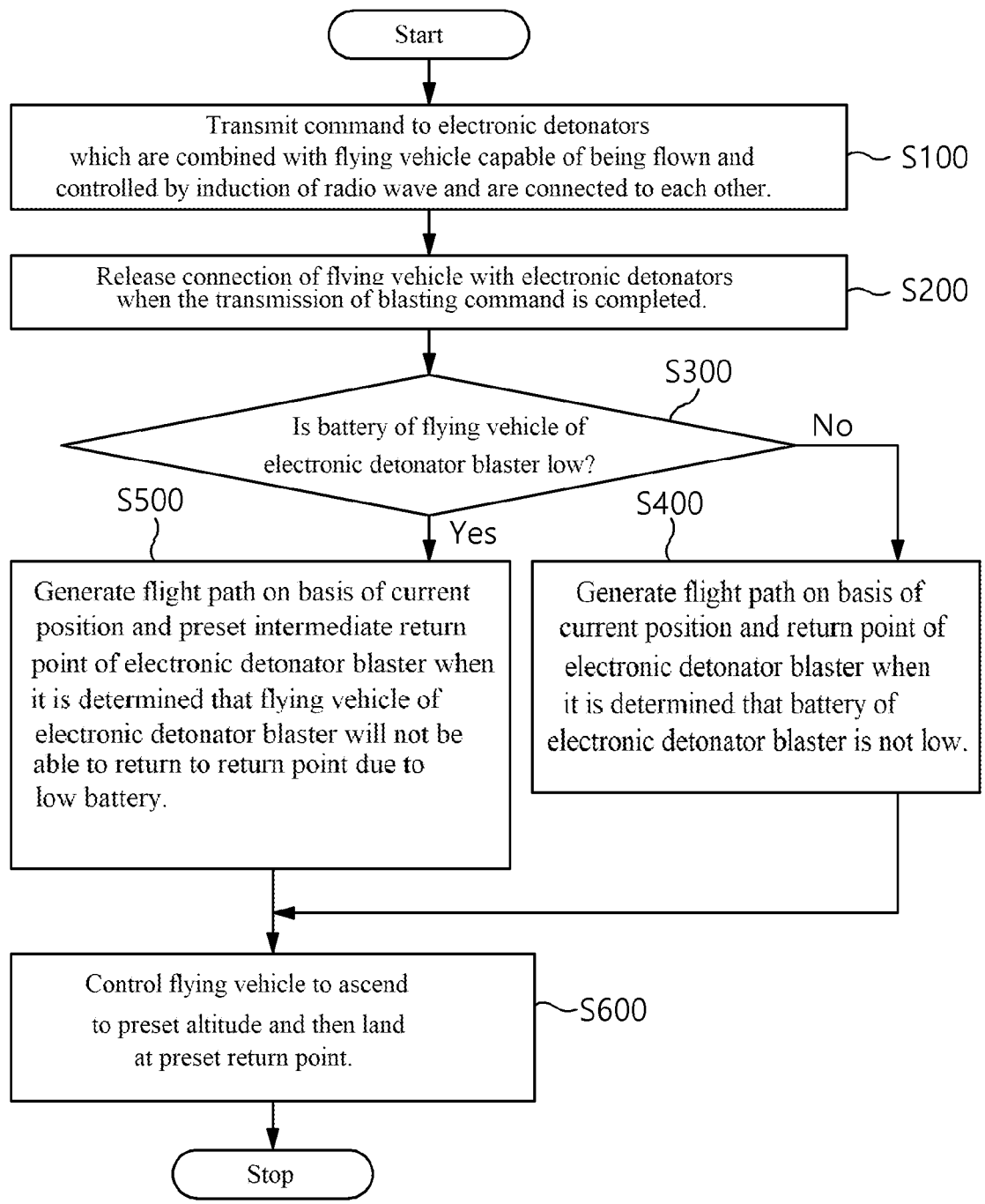

APPARATUS AND METHOD FOR OPERATING ELECTRONIC DETONATOR BLASTER WITH INTEGRATED FLIGHT FUNCTION

TECHNICAL FIELD

The present disclosure relates, in general, to an apparatus and a method for operating an electronic detonator blaster with an integrated flight function and, more particularly, to an apparatus and a method for operating an electronic detonator blaster with an integrated flight function, in which when the transmission of a blasting command to each of electronic detonators which are combined with a flying vehicle capable of being flown and controlled by induction of radio waves and are connected to each other is completed, the flying vehicle of the electronic detonator blaster is controlled to operate and ascend to a preset altitude and then land at a preset return point.

BACKGROUND ART

An electric blasting fuse, or detonator, is detonated when receiving sufficient electrical energy from a power source. A magnetic oscillation-type booster circuit is used, and boosted energy is charged in a capacitor to be used for detonation. In the process of charging the capacitor with sufficient energy for detonation, the state of the circuit is changed by the supply voltage of the battery and other conditions, causing problems such as stopping of oscillation or overcurrent.

Furthermore, according to the amount of charging energy charged in the capacitor, the range of change in current required for charging is large, and it is difficult to actively control this due to the nature of a magnetic oscillator, and it is easy to cause defects due to the non-uniformity of the material of a core and the number of turns of a coil during mass production.

Additionally, when approaching a blasting area to recover an electronic detonator blaster after blasting, there is possibility of an accident during the recovery of the electronic detonator blaster due to unstable ground conditions, and there is a risk of loss of or damage to the blaster due to blasting vibration or flying stone.

In addition, in order to solve the problem that wireless communication is not efficient when Line of Sight (hereinafter referred to as LoS) is not established on a communication path between an electronic detonator blaster and a remote machine, a repeater is installed at a fixed place on the ground. However, it is difficult to select a place on the ground on which Los is established on both sides of the remote machine and the blaster, and it is difficult to operate a fixed repeater because a blasting point at which the remote machine is located changes every time at which blasting occurs.

In this regard, many documents such as Korean Patent No. 10-1016538, Korean Patent No. 10-0665878, Korean Patent No. 10-0665880, Korean Patent No. 10-0733346, and Japanese Patent Application Publication No. 2005-520115 disclose a blasting system using an electronic detonator.

DISCLOSURE

Technical Problem

The present disclosure has been made to solve the above problems and is intended to propose an apparatus and a method for operating an electronic detonator blaster with an integrated flight fiction, in which when the transmission of a blasting command to each of electronic detonators which are combined with a flying vehicle capable of being flown and controlled by induction of radio waves and are connected to each other is completed, the flying vehicle of the electronic detonator blaster is controlled to operate and ascend to a preset altitude and then land at a preset return point.

In addition, the present disclosure is intended to propose an apparatus and a method for operating an electronic detonator blaster with an integrated flight function, in which when it is determined that the flying vehicle of the electronic detonator blaster will not be able to return to a return point due to low battery of the electronic detonator blaster, a flight path is generated on the basis of the current position and a preset intermediate return point of the electronic detonator blaster.

Technical Solution

In order to achieve the above objectives, an apparatus for operating an electronic detonator blaster with an integrated flight function according to the present disclosure includes: a blasting command transmission part configured to transmit a blasting command to each of electronic detonators which are combined with a flying vehicle capable of being flown and controlled by induction of radio waves and are connected to each other, a connection control part configured to release the connection of the flying vehicle with the electronic detonators when the transmission of the blasting command is completed; and a flight control part configured to control the flying vehicle to land at a preset return point after ascending to a preset altitude when the connection of the flying vehicle with the electronic detonators is completely released.

In addition, the blasting command transmission part may proceed with a blasting sequence through a relay mode device located in the air and relaying a signal of a remote control device.

In addition, in the connection control part, in a case in which the flying vehicle is magnetically connected to each of the electronic detonators in a quick connect form, when the transmission of the blasting command is completed, the connection may be released by turning off a magnetic force with a pre-provided magnetic force regulator, and in a case in which the flying vehicle is connected to each of the electronic detonators by a busbar, when the transmission of the blasting command is completed, the connection may be released by cutting the busbar with a pre-provided cutter.

In addition, when the electronic detonator blaster and each of the electronic detonators are connected to each other in the quick connect form, the electronic detonator blaster may be placed through alignment with a marker of a connect base after flying to preset coordinates of the connect base.

In addition, the flight control part may include: a take-off part configured to allow the flying vehicle of the electronic detonator blaster to take off and to ascend to the preset altitude when the connection of the flying vehicle with the electronic detonators is completely released; a flight path generation part configured to generate a flight path on a basis of a current position and the return point of the electronic detonator blaster; a flight part configured to control the flying vehicle of the electronic detonator blaster to fly to the preset return point on a basis of the generated flight path when a preset period of time elapses after the ascent; and a landing part configured to control the flying vehicle to land at the return point by detecting a direction of travel of the flying vehicle and changing and rotating the direction of travel of the flying vehicle on a basis of the detected travel direction when the flying vehicle of the electronic detonator blaster enters an area within a predetermined limit distance from the return point.

In addition, the flight control part may further include a remaining battery level determination part for determining a remaining battery level of the flying vehicle of the electronic detonator blaster, and when it is determined that the flying vehicle of the electronic detonator blaster will not be able to return to the return point due to low battery, the flight path generation part may generate a flight path on a basis of the current position and a preset intermediate return point of the electronic detonator blaster.

In addition, the apparatus may further include: a distress notification part notifying of a current location of the electronic detonator blaster by transmitting a beacon signal including received GPS coordinates and transmitting at least one of sound and light-emitting signals when receiving a response signal to the beacon signal to when it is determined that the electronic detonator blaster is in distress.

To achieve the above objectives, a method for operating an electronic detonator blaster with an integrated flight function according to the present disclosure includes: transmitting, by a blasting command transmission part, a blasting command to each of electronic detonators which are combined with a flying vehicle capable of being flown and controlled by induction of radio waves and are connected to each other; releasing, by a connection control part, the connection of the flying vehicle with the electronic detonators when the transmission of the blasting command is completed; and controlling, by a flight control part, the flying vehicle to land at a preset return point after ascending to a preset altitude when the connection of the flying vehicle with the electronic detonators is completely released.

In addition, in the releasing of the connection of the flying vehicle with the electronic detonators when the transmission of the blasting command is completed, in the case in which the flying vehicle is magnetically connected to each of the electronic detonators in the quick connect form, when the transmission of the blasting command is completed, the connection may be released by turning off a magnetic force with a pre-provided magnetic force regulator, and in the case in which the flying vehicle is corrected to each of the electronic detonators by the busbar, when the transmission of the blasting command is completed, the connection may be released by cutting the busbar with a pre-provided cutter.

In addition, the controlling of the flying vehicle to land at the preset return point after ascending to the preset altitude when the connection of the flying vehicle with the electronic detonators is completely released may include: performing a take-off of the flying vehicle of the electronic detonator blaster so that the flying vehicle ascends to the preset altitude when the connection of the flying vehicle with the electronic detonators is completely released; generating a flight path on a basis of a current position and the return point of the electronic detonator blaster; controlling the flying vehicle of the electronic detonator blaster to fly to the preset return point on a basis of the generated flight path when a preset period of time elapses after the ascent; and controlling the flying vehicle to land at the return point by detecting a direction of travel of the flying vehicle and changing and rotating the direction of travel of the flying vehicle on a basis of the detected travel direction when the flying vehicle of the electronic detonator blaster enters an area within a predetermined limit distance from the return point.

In addition, the controlling of the flying vehicle to land at the preset return point after ascending to the preset altitude when the connection of the flying vehicle with the electronic detonators is completely released may further include: determining a remaining battery level of the flying vehicle of the electronic detonator blaster, wherein it is determined that the flying vehicle of the electronic detonator blaster will not be able to return to the return point due to low battery, a flight path may be generated on a basis of the current position and a preset intermediate return point of the electronic detonator blaster.

Advantageous Effects

To achieve the objectives described above, according to the apparatus and method for operating an electronic detonator blaster with an integrated flight function according to the present disclosure, when the transmission of a blasting command to each of electronic detonators which are combined with a flying vehicle capable of being flown and controlled by induction of radio waves and are connected to each other is completed, the flying vehicle of the electronic detonator blaster is controlled to operate and ascend to a preset altitude for preventing damage to the blaster caused by a blasting impact and to land at a preset return point when a preset period of time elapses after the ascent, thereby eliminating need for a worker to approach the site on foot to retrieve the blaster and improving worker safety.

In addition, according to the present disclosure, when it is determined that the flying vehicle of the electronic detonator blaster will not be able to return to the return point due to low battery of the electronic detonator blaster, a flight path is generated on the basis of the current position and preset intermediate return point of the electronic detonator blaster, thereby increasing the recovery rate of the blaster.

DESCRIPTION OF DRAWINGS

FIG. 4 is a flowchart illustrating sequence of the method for operating an electronic detonator blaster with an integrated flight function according to the present disclosure.

DESCRIPTION OF THE REFERENCE NUMERALS IN THE DRAWINGS

Figure 1:
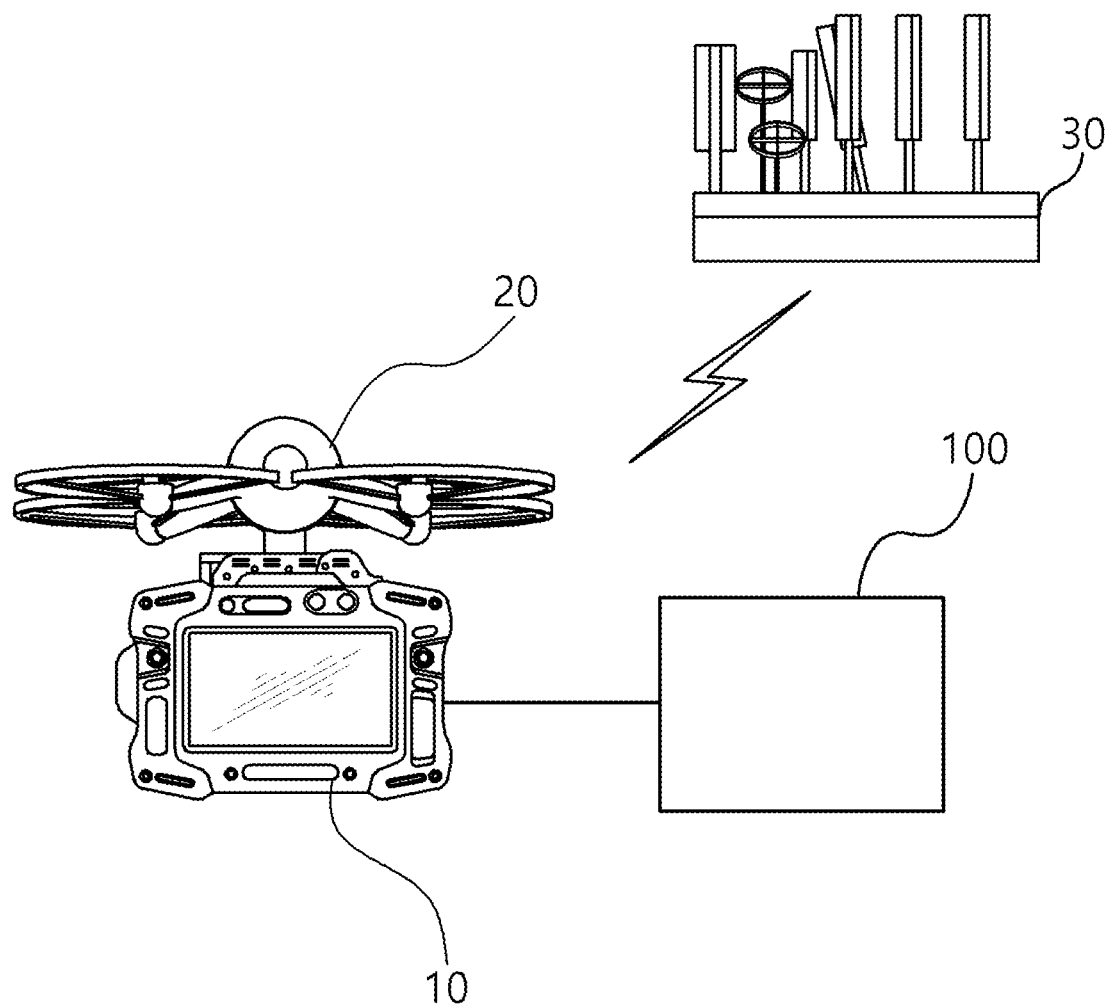
FIG. 1 is a view illustrating the configuration of a system to which an apparatus for operating an electronic detonator blaster with an integrated flight function according to the present disclosure is applied.

100: Apparatus for operating electronic detonator blaster with integrated flight function
110: Blasting command transmission part
120: Connection control part
130: Remaining battery level determination part
140: Flight control part

BEST MODE

The present disclosure may be subject to various changes and may have multiple embodiments, and specific embodiments are illustrated in the drawings and described in detail. However, this is not intended to limit the present disclosure to the specific embodiments, and should be understood to include all changes, equivalents, or substitutes included in the spirit and technical scope of the present disclosure. Like reference numbers have been used for like elements throughout the description of each of the drawings.

It should be understood that when an element is referred to as being "coupled" or "connected" to another element, it may be directly coupled or connected to the other element of intervening elements may be present therebetween. In contrast, it should be understood that when an element is referred to as being "directly coupled" or "directly connected" to another element, there are no intervening elements present therebetween.

Terms used in this specification are only used to describe specific embodiments, and are not intended to limit the present disclosure. Singular expressions include plural expressions unless the context clearly dictates otherwise. It should be understood that terms such as "include", and "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, with reference to the accompanying drawings, exemplary embodiments of the present disclosure will be described in more detail. Hereinafter, the same reference numerals are used for the same components in the drawings, and redundant descriptions of the same components are omitted.

FIG. 1 is a view illustrating the configuration of a system to which an apparatus for operating an electronic detonator blaster with an integrated flight function according to the present disclosure is applied.

Referring to FIG. 1, the system to which the apparatus for operating an electronic detonator blaster with an integrated flight function according to the present disclosure is applied may largely include the electronic detonator blaster 10 combined with a flying vehicle 20, the apparatus 100 for operating an electronic detonator blaster with an integrated flight function, and a relay mode device 30 for relaying a signal of a remote control device.

The electronic detonator blaster 10 combined with the flying vehicle 20 transmits a blasting command to each of electronic detonators, and when the transmission of the blasting command is completed, the flying vehicle 20 operates so that flying vehicle 20 can land at a preset return point. At this time, the flying vehicle 20 may be configured as a drone capable of being flown and controlled by induction of radio waves.

Since the electronic detonator blaster 10 has cameras provided on a front part of the electronic detonator blaster 10 in a traveling direction and a lower part thereof, the electronic detonator blaster 10 can transmit the video feeds of the corresponding cameras wirelessly. In addition, the electronic detonator blaster 10 has an LCD mounted on an upper part or side surface thereof to perform the function of device pairing, etc., and a GPS (a global positioning system), a 3-axis gyroscope, a 3-axis accelerometer, and a geomagnetometer. In addition, the electronic detonator blaster 10 has waterproof and dustproof performances at a level capable of responding to rainy weather.

In the apparatus 100 for operating an electronic detonator blaster with an integrated flight function, upon completion of the transmission of the blasting command from the electronic detonator blaster, which transmits a blasting command to the electronic detonators, the flying vehicle of the electronic detonator blaster is controlled to operate and land at the preset return point.

The relay mode device 30 is located in the air and relays a signal of the remote control device.

In this case, the remote control device is a device that selects and controls each electronic detonator blaster 10. That is, the remote control device selects a specific electronic detonator blaster 10 to wirelessly receive video feeds therefrom and can navigate the specific electronic detonator blaster 10 manually.

The relay mode device 30 may relay a signal while maintaining the GPS spatial coordinates (LAT, LON, ALT) of a pre-specified or manually adjusted location.

Figure 2:
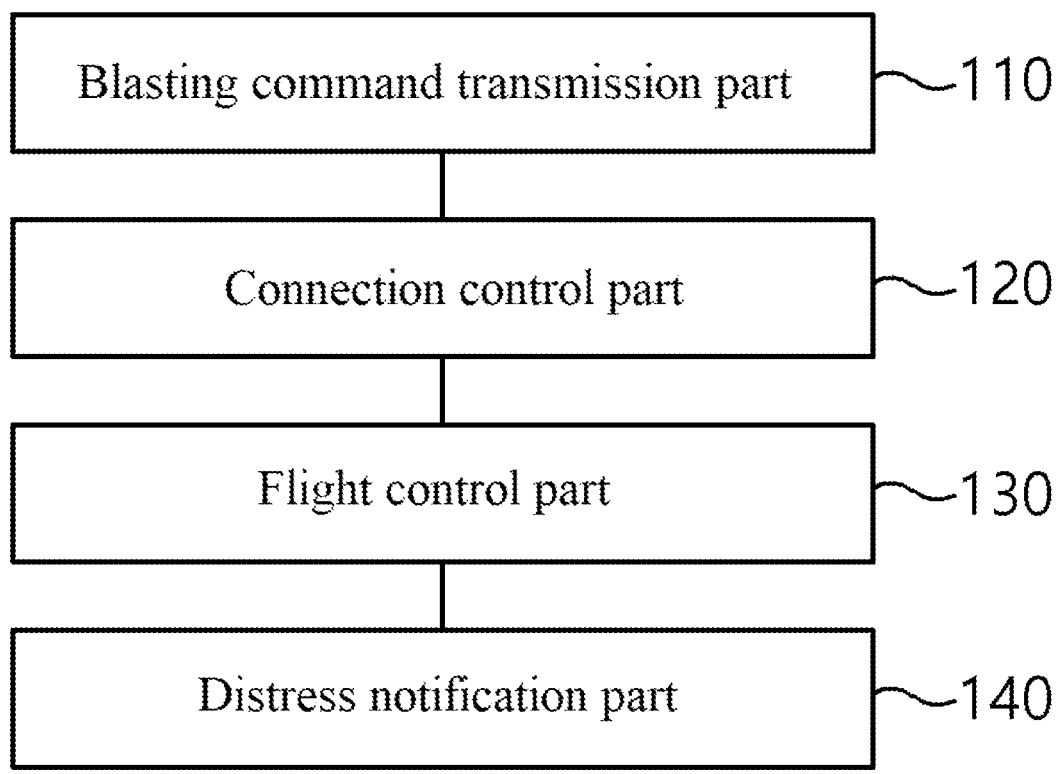
FIG. 2 is a view illustrating the configuration of the apparatus for operating an electronic detonator blaster with an integrated flight function according to the present disclosure.

FIG. 2 is a view illustrating the configuration of the apparatus for operating an electronic detonator blaster with an integrated flight function according to the present disclosure.

Referring to FIG. 2, the apparatus 100 for operating an electronic detonator blaster with an integrated flight function according to the present disclosure includes a blasting command transmission part 110, a connection control part 120, a flight control part 130, and a distress notification part 140.

The blasting command transmission part 110 transmits a blasting command to each of the electronic detonators which are combined with the flying vehicle capable of being flown and controlled by induction of radio waves and are connected to each other.

The blasting command transmission part 110 may proceed with a blasting sequence through the relay mode device located in the air and relaying the signal of the remote control device.

The connection control part 120 releases the connection of the electronic detonator blaster with the electronic detonators when the transmission of the blasting command is completed.

In the connection control part 120, in a case in which the electronic detonator blaster is magnetically connected to each of the electronic detonators in a quick connect form, when the transmission of the blasting command is completed, the connection may be released by turning off a magnetic force with a pre-provided magnetic force regulator, and in a case in which the electronic detonator blaster is connected to each of the electronic detonators by a busbar, when the transmission of the blasting command is completed, the connection may be released by cutting the busbar with a pre-provided cutter.

Here, when the electronic detonator blaster and each of the electronic detonators are connected to each other in the quick connect form, the electronic detonator blaster may be placed through alignment with a marker of a connect base after flying to preset coordinates of the connect base.

When the connection of the electronic detonator blaster with the electronic detonators is completely released, the flight control part 130 controls the flying vehicle to ascend to a preset altitude and then land at the preset return point. This will be described in detail with reference to FIG. 3 to be described later. Here, the ascent of the flying vehicle of the electronic detonator blaster to the preset altitude is intended to prevent rock fragments from flying and damaging the blaster due to a blasting impact.

When it is determined that the electronic detonator blaster is in distress for some reasons (no return command, overturning of the electronic detonator blaster, and a crash thereof, etc.), the distress notification part 140 transmits a beacon signal including received GPS coordinates, and transmits at least one of sound and light-emitting signals when receiving a response signal to the beacon signal to notify of a current location of the blaster.

Figure 3:
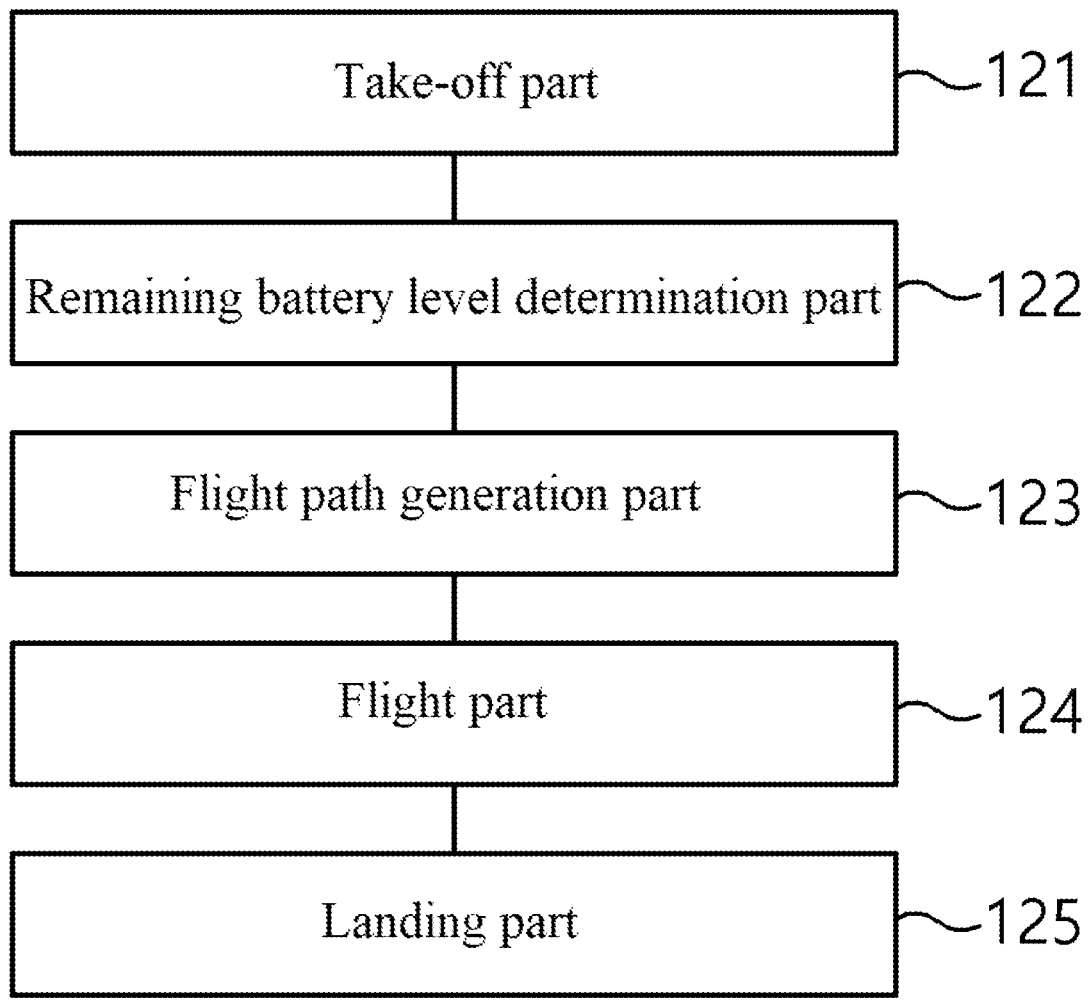
FIG. 3 is a view illustrating the detailed configuration of a flight control part employed in the apparatus for operating an electronic detonator blaster with an integrated flight function according to the present disclosure.

FIG. 3 is a view illustrating the detailed configuration of the flight control part employed in the apparatus for operating an electronic detonator blaster with an integrated flight function according to the present disclosure.

Referring to FIG. 3, when the connection of the flying vehicle with the electronic detonators is completely released, the flight control part 120 controls the flying vehicle to land at the preset return point after ascending to the preset altitude.

To the end, the flight control part 120 may include a take-off part 121, a remaining battery level determination part 122, a flight path generation part 123, a flight part 124, and a landing part 125.

When the connection of the flying vehicle with the electronic detonators is completely released, the take-off part 121 causes the flying vehicle of the electronic detonator blaster to take off and ascend to the preset altitude.

The remaining battery level determination part 122 determines the remaining battery level of the flying vehicle of the electronic detonator blaster.

The flight path generation part 123 generates a flight path on the basis of the current position and return point of the electronic detonator blaster.

When it is determined that the flying vehicle of the electronic detonator blaster will not be able to return to the return point due to low battery, the flight path generation part 123 may generate a flight path on the basis of the current position and preset intermediate return point of the electronic detonator blaster.

The flight part 124 controls the flying vehicle of the electronic detonator blaster to fly to the preset return point on the basis of the generated flight path when a preset period of time elapses after the flying vehicle ascends.

When the flying vehicle of the electronic detonator blaster enters an area within a predetermined limit distance from the return point, the landing part 125 detects the direction of travel of the flying vehicle and controls the flying vehicle to land at the return point by changing and rotating the direction of the flying vehicle on the basis of the detected travel direction.

FIG. 4 is a flowchart illustrating the sequence of the method for operating an electronic detonator blaster with an integrated flight function according to the present disclosure.

Referring to FIG. 5, the method for operating an electronic detonator blaster with an integrated flight function according to the present disclosure uses the apparatus for operating an electronic detonator blaster with an integrated flight function according to the present disclosure described above, and redundant descriptions will be omitted below.

Fast, a blasting command is transmitted to each of the electronic detonators which are combined with the flying vehicle capable of being flown and controlled by the induction of radio waves and are connected to each other at S100.

At S100, the blasting sequence may proceed through the relay mode device located in the air and relaying the signal of the remote control device.

Next, when the transmission of the blasting command is completed, the connection of the electronic detonator blaster with each of the electronic detonators is released at S200.

At S200, in the case in which the electronic detonator blaster is magnetically connected to each of the electronic detonators in the quick connect form, when the transmission of the blasting command is completed, the connection may be released by turning off magnetic force with the pre-provided magnetic force regulator, and in the case in which the electronic detonator blaster is connected to each of the electronic detonators by a busbar, when the transmission of the blasting command is completed, the connection may be released by cutting the busbar with the pre-provided cutter.

Next, when the connection of the electronic detonator blaster with the electronic detonators is completely released, the remaining battery level of the flying vehicle of the electronic detonator blaster is determined at S300.

Next, when it is determined that the battery of the electronic detonator blaster is not low at S300, the flight path is generated on the basis of the current position and return point of the electronic detonator blaster at S400.

Meanwhile, when it is determined that the flying vehicle of the electronic detonator blaster will not be able to return to the return point due to the low battery of the electronic detonator blaster at S300, the flight path is generated on the basis of the current position and preset intermediate return point of the electronic detonator blaster at S500.

Next, the flying vehicle is controlled to land at the preset return point after ascending to the preset altitude at S600.

The functional operations described in this specification and the embodiments related to the present subject matter can be implemented in digital electronic circuits, computer software, firmware, or hardware, or in a combination of at least two thereof, including the structures disclosed in this specification and their structural equivalents.

The embodiments of the subject matter described in the present specification may be implemented as at least one module for one or more computer program commands encoded on a tangible program medium for execution by one or more computer program products, that is, a data processing device or for controlling the operation. The tangible program medium may be a radio signal or computer readable medium. The radio signal is an artificially generated signal such as a machine-generated electrical, optical or electromagnetic signal, which is generated for encoding information to be transmitted to a suitable receiver device for execution by a computer. The computer readable medium may be a machine readable storage device, a machine readable storage substrate, a memory device, a combination of materials that affect a machine readable radio signal, or a combination of at least two thereof.

A computer program (also known as a program, software, software application, script, or code) may be written in any form of programming language, including compiled or interpreted language or a priori or procedural language, and may be deployed in any form including stand-alone programs or modules, components, subroutines, or other units suitable to be used in a computer environment.

A computer program does not necessarily correspond to a file on a file device. A program may be stored in a single file provided to a requested program, in multiple interacting files (e.g., a file which stores one or more modules, a subprogram, or a portion of a code), or in a portion of a file holding other programs or data (e.g., one or more scripts stored in a markup language document).

A computer program may be located at one site or may be distributed across a plurality of sites and may be deployed to run on multiple computers interconnected by a communication network or on one computer.

Additionally, a logic flow and structural block diagrams described in this patent document describe corresponding actions and/or specific methods supported by corresponding functions and steps supported by the disclosed structural means and can be used to establish corresponding software structures and algorithms and equivalents thereof.

Processes and logic flows described in the present specification can be performed by one or more programmable processors executing one or more computer programs to perform functions by operating on received data and generating outputs.

A processor suitable for the execution of computer programs includes, for example, both general and special purpose microprocessors and any one or more processors of any type of digital computer. Generally, a processor receives commands and data from either read-only memory or random access memory or both of them.

The core elements of a computer are one or more memory devices for storing commands and data and a processor for executing the commands. In addition, a computer may be generally operably coupled to one or more mass storage devices for receiving data from the mass storage devices for storing data, such as magneto-optical disks or optical disks, or transferring data thereto or performing both of such operations or may include the mass storage devices. However, a computer is not required to have such a device.

The present description presents the best mode of the present disclosure, and provides examples to describe the present disclosure and to enable those skilled in the art to manufacture and use the apparatus of the present disclosure. The specification prepared in this way does not limit the present disclosure to specific terms presented.

Accordingly, although the present disclosure has been described in detail with reference to the above-described examples, those skilled in the art may make modifications, and changes, and variations of the present examples without departing from the scope of the present disclosure. In short, in order to achieve the intended effects of the present disclosure, it is not necessary to separately include all function blocks shown in the drawings or to follow all the order shown in the drawings in the same order shown. It should be noted that even if not, the present disclosure may fall within the technical scope of the claims.

The invention claimed is:

1. An apparatus for operating an electronic detonator blaster with an integrated flight function, the apparatus comprising:
   a blasting command transmission part configured to transmit a blasting command to each of electronic detonators which are combined with a flying vehicle capable of being flown and controlled by induction of radio waves and are connected to each other;
   a connection control part configured to release the connection of the flying vehicle with the electronic detonators when the transmission of the blasting command is completed;
   a flight control part configured to control the flying vehicle to land at a preset return point after ascending to a preset altitude when the connection of the flying vehicle with the electronic detonators is completely released; and
   a distress notification part notifying of a current location of the electronic detonator blaster by transmitting a beacon signal including received GPS coordinates and transmitting at least one of sound and light-emitting signals when receiving a response signal to the beacon signal to when it is determined that the electronic detonator blaster is in distress.

2. The apparatus of claim 1, wherein the blasting command transmission part proceeds with a blasting sequence through a relay mode device located in the air and relaying a signal of a remote control device.

3. The apparatus of claim 1, wherein in the connection control part, in a case in which the flying vehicle is magnetically connected to each of the electronic detonators in a quick connect form, when the transmission of the blasting command is completed, the connection is released by turning off a magnetic force with a pre-provided magnetic force regulator, and in a case in which the flying vehicle is connected to each of the electronic detonators by a busbar, when the transmission of the blasting command is completed, the connection is released by cutting the busbar with a pre-provided cutter.

4. The apparatus of claim 3, wherein when the electronic detonator blaster and each of the electronic detonators are connected to each other in the quick connect form, the electronic detonator blaster is placed through alignment with a marker of a connect base after flying to preset coordinates of the connect base.

5. The apparatus of claim 1, wherein the flight control part comprises:
   a take-off part configured to allow the flying vehicle of the electronic detonator blaster to take off and to ascend to the preset altitude when the connection of the flying vehicle with the electronic detonators is completely released;
   a flight path generation part configured to generate a flight path on a basis of a current position and the return point of the electronic detonator blaster;
   a flight part configured to control the flying vehicle of the electronic detonator blaster to fly to the preset return point on a basis of the generated flight path when a preset period of time elapses after the ascent; and
   a landing part configured to control the flying vehicle to land at the return point by detecting a direction of travel of the flying vehicle and changing and rotating the direction of travel of the flying vehicle on a basis of the detected travel direction when the flying vehicle of the electronic detonator blaster enters an area within a predetermined limit distance from the return point.

6. The apparatus of claim 5, wherein the flight control part further comprises a remaining battery level determination part for determining a remaining battery level of the flying vehicle of the electronic detonator blaster, and
   when it is determined that the flying vehicle of the electronic detonator blaster will not be able to return to the return point due to low battery, the flight path generation part generates a flight path on a basis of the current position and a preset intermediate return point of the electronic detonator blaster.

7. A method for operating an electronic detonator blaster with an integrated flight function, the method comprising:
   transmitting, by a blasting command transmission part, a blasting command to each of electronic detonators which are combined with a flying vehicle capable of being flown and controlled by induction of radio waves and are connected to each other;
   releasing, by a connection control part, the connection of the flying vehicle with the electronic detonators when the transmission of the blasting command is completed;
   controlling, by a flight control part, the flying vehicle to land at a preset return point after ascending to a preset altitude when the connection of the flying vehicle with the electronic detonators is completely released; and notifying, by a distress notification part, a current location of the electronic detonator blaster by transmitting a beacon signal including received GPS coordinates and transmitting at least one of sound and light-emitting signals when receiving a response signal to the beacon signal to when it is determined that the electronic detonator blaster is in distress.

8. The method of claim 7, wherein in the releasing of the connection of the flying vehicle with the electronic detonators when the transmission of the blasting command is completed, in a case in which the flying vehicle is magnetically connected to each of the electronic detonators in a quick connect form, when the transmission of the blasting command is completed, the connection is released by turning off a magnetic force with a pre-provided magnetic force regulator, and in a case in which the flying vehicle is connected to each of the electronic detonators by a busbar, when the transmission of the blasting command is completed, the connection is released by cutting the busbar with a pre-provided cutter.

9. The method of claim 7, wherein the controlling of the flying vehicle to land at the preset return point after ascending to the preset altitude when the connection of the flying vehicle with the electronic detonators is completely released comprises:

performing a take-off of the flying vehicle of the electronic detonator blaster so that the flying vehicle ascends to the preset altitude when the connection of the flying vehicle with the electronic detonators is completely released;

generating a flight path on a basis of a current position and the return point of the electronic detonator blaster;

controlling the flying vehicle of the electronic detonator blaster to fly to the preset return point on a basis of the generated flight path when a preset period of time elapses after the ascent; and controlling the flying vehicle to land at the return point by detecting a direction of travel of the flying vehicle and changing and rotating the direction of travel of the flying vehicle on a basis of the detected travel direction when the flying vehicle of the electronic detonator blaster enters an area within a predetermined limit distance from the return point.

10. The method of claim 9, wherein the controlling of the flying vehicle to land at the preset return point after ascending to the preset altitude when the connection of the flying vehicle with the electronic detonators is completely released further comprises:

determining a remaining battery level of the flying vehicle of the electronic detonator blaster, wherein it is determined that the flying vehicle of the electronic detonator blaster will not be able to return to the return point due to low battery, a flight path is generated on a basis of the current position and a preset intermediate return point of the electronic detonator blaster.

* * * * *